Patented May 15, 1951

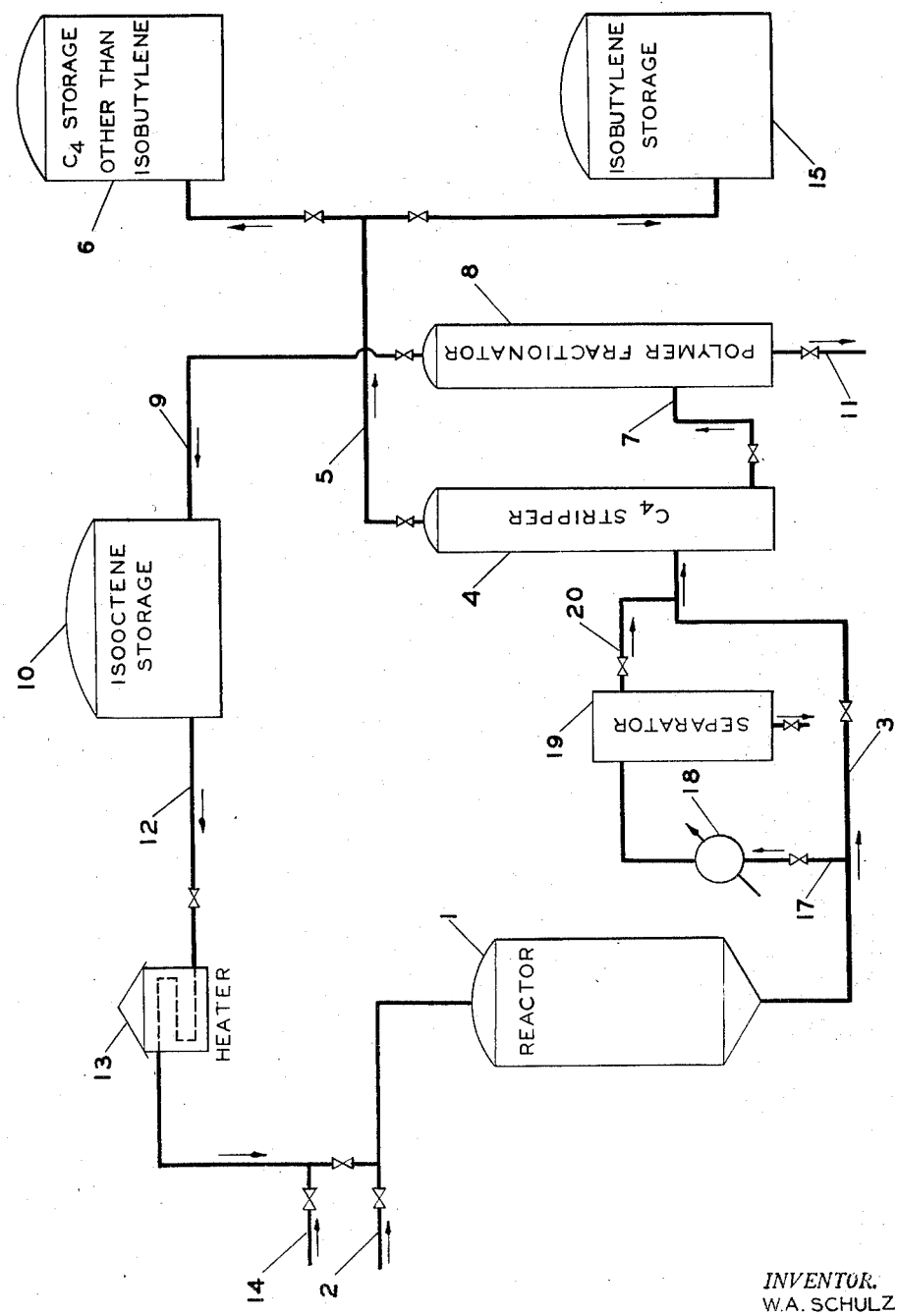

2,552,692

UNITED STATES PATENT OFFICE 2,552,692

EXTRACTION OF ISOBUTYLENE BY POLYMERIZATION AND DEPOLYMERIZATION

Walter A. Schulze and John E. Mahan, Bartlesville, Okla., assignors to Phillips Petroleum Company, a corporation of Delaware Application November 20, 1947, Serial No. 787,250

3 Claims. (Cl. 260—677)

The present invention relates to a method for the recovery of olefins from streams in which they are contained together with other constituents. More specifically, it relates to a process for the recovery of olefins in substantially pure form from impure mixtures containing the same. In a particular aspect, the invention relates to a method for the recovery of isobutylene in a substantially pure state from a mixed $C_4$ stream in which isobutylene is contained as a component thereof.

Numerous processes in modern industry utilize large quantities of isobutylene. Typical among these are the manufacture of butyl rubber, high octane motor fuel, high molecular weight lube oil additives, and the like. In many instances these processes require isobutylene in a high state of purity. An important source of isobutylene lies in the mixed $C_4$ gas streams from petroleum refining. However, since the boiling points of the hydrocarbons contained in such streams lie in a very narrow range, separation of pure isobutylene from them by conventional fractionation procedures is substantially impossible. In the past a method has been employed for effecting such separation by selective absorption and polymerization of the isobutylene in sulfuric acid, separation of the polymer so obtained and subsequent depolymerization to isobutylene. However such method of operation involves the use of large volumes of acid, expensive equipment, and high operating costs.

In accordance with the invention olefin-containing streams are contacted with solid contact polymerization catalysts in order to effect polymerization of the olefins to form dimers or heavier materials and then depolymerized to reform the olefin which is then recovered in substantially pure form. The depolymerization is effected utilizing catalyst which has become spent in the polymerization process.

The invention is particularly applicable to the extraction of substantially pure isobutylene from mixed $C_4$ refinery streams wherein the operations of polymerization and depolymerization are effected cyclicly over a solid-type catalyst thereby providing efficient yields, rapid operation, and substantial economies both in equipment and operational costs. By the method of our invention the separation proceeds in a series of steps: (a) passing of a mixed $C_4$ or other isobutylene-containing stream over a specific solid type catalyst under conditions for a high degree of conversion of isobutylene to diisobutylene with only minor polymerization of other components; (b) fractionation of the effluent to separate substantially pure diisobutylene; (c) recycling diisobutylene in admixture with steam over the used catalyst of step $a$ under depolymerizing conditions to provide substantially pure isobutylene as product.

The solid adsorbent catalysts employed in our process are most accurately described as dried gels and are characterized by their chemical composition, their physical properties and by the specific methods of their preparation, said methods being responsible in large part for their catalytic activity. Although these catalysts are broadly referred to as metallic oxide promoted silica gel compositions, it is to be understood that they have distinctly different catalytic properties from the naturally occurring minerals which contain some of the same components. For example, the acid treated bleaching earths, clays, kaolins, and similar naturally occurring silicates bear no resemblance in composition to our preferred synthetic catalysts.

The catalysts of this invention are prepared by forming a hydrous silica gel or jelly, usually from an alkali metal silicate and an acid, washing soluble material therefrom, treating or activating said gel with an aqueous solution of a suitable metal salt, and subsequently washing and drying the treated material. In this manner a part of the metal, presumably in the form of a hydrous oxide or loose hydroxide compound formed by hydrolysis, is selectively adsorbed by the hydrous silica and is not removed by subsequent washing. The most frequently used catalyst of this type is a silica-alumina catalyst prepared by treating a wet or partially dried hydrous silica gel with an aluminum salt such as a solution of aluminum chloride or sulfate, and finally washing and drying the treated material. Other catalysts of a similar nature may be prepared by using, instead of an aluminum salt, a hydrolyzable salt of a metal selected from group III–B or from group IV–A of the periodic system. More particularly, salts of indium and thallium in addition to aluminum from group III–B, and salts of titanium, zirconium, and thorium from group IV–A are employed. Whether prepared by this method or by some modification thereof, the catalyst will contain a major portion of silica and a minor portion of metal oxide. This minor portion of metal oxide, such as alumina, will generally not be in excess of ten per cent by weight and will more often range from about 0.1 to 2.0 per cent by weight. The preparation of our preferred solid type catalysts is herein presented, not as a part of the invention but in the interests of clarity. Further details for the preparation of these catalysts are disclosed in copending application, Serial Number 460,845 filed October 5, 1942, now Patent No. 2,419,599, to which reference is made.

When operating with our preferred catalysts, polymerization is effected at temperatures in the range 125 to 375° F., beginning in the lower portion of the range and increasing in a stepwise manner such that maximum catalyst activity is constantly maintained. Pressures during the polymerization part of the cycle are maintained in the range of 1000 to 2000 pounds per square inch gauge. When no further temperature elevation can be made without exceeding the effective range for polymerization, the flow of $C_4$ hydrocarbons is halted. The pressure is then lowered to from atmospheric to 100 pounds per square inch gauge and the temperature elevated to the depolymerization range which lies between 350 and 850° F., preferably between 400 and 750° F. Diisobutylene separated from the effluent produced in the polymerization part of the cycle by fractionation is then heated and mixed with steam in substantially volume for volume ratio (vapor phase conditions) and passed over the catalyst. Temperatures for the depolymerization part of the cycle are increased in a stepwise manner as before to maintain the maximum activity of the catalyst as the reaction proceeds.

The advantages of our process will be more apparent from a description of the accompanying diagram in which is shown a flow sheet for one form of apparatus in which the objects of the invention can be accomplished. Referring to the diagram, a feed stream comprising mixed $C_4$ hydrocarbons is fed to reactor 1 through line 2. In the reactor the mixture is contacted with a catalyst comprising synthetic hydrated silica-alumina under conditions for a high degree of polymerization of isobutylene to isooctenes. The effluent is discharged via line 3 to stripping column 4 where $C_4$ constituents previously associated with the isobutylene are removed overhead through line 5 and conveyed to storage 6. The kettle product is discharged via line 7 to polymer fractionator 8 where isooctenes boiling in the range 212 to 220° F. are removed overhead in line 9 to storage 10. Higher boiling bottoms are removed through line 11. The polymerization part of the cycle thus described is continued with temperatures in the catalyst zone beginning in the lower levels of the polymerization range and increased in a stepwise manner from time to time as may be necessary to obtain maximum activity of the catalyst until the upper limits for efficient formation of isooctene have been reached.

When the polymerization part of the cycle has been completed the flow of $C_4$ hydrocarbons is halted and the second or depolymerization part of the cycle is initiated by passing isooctenes from storage 10 through line 12 and through heater 13 where the temperature is elevated to the depolymerization range of 350° to 800° F. Steam from line 14 is admixed with the stream in approximately a volume for volume ratio, under vapor phase conditions, and the mixture is introduced into reactor 1. In the reactor the heated feed stream is passed over the catalyst under approximately atmospheric pressure whereby a high degree of depolymerization of isooctenes to isobutylene is effected. The effluent is discharged via lines 3 and 17 through condenser 18 into separator 19 where the hydrocarbon products of the reaction are separated from the water and flow through line 20 into the $C_4$ stripper 4 where isobutylene is removed overhead and conveyed to storage 15 via line 5. High-boiling bottoms are discharged through line 7 to polymer fractionator 8 where unreacted isooctenes are taken overhead via line 9 for recycling. Any material boiling above the isooctene range, such as might result from isomerization in the catalyst zone is discharged through line 11. The depolymerization part of the cycle is started at the lower level of the depolymerization temperature range and as the process proceeds, the temperature is increased from time to time in a stepwise manner to maintain the maximum catalyst activity. Such method of operation is continued until the maximum temperature limit at which effective depolymerization can be effected has been reached at which point the cycle is halted.

While we have preferred to operate the depolymerization step of our process using about one volume of steam for each volume of hydrocarbon in the vapor phase, greater or less amounts may be used if desired. The purpose of the steam is to effect a reduction in partial pressures of the hydrocarbon thereby providing conditions most favorable for the depolymerization of isooctenes. While higher ratios of steam to hydrocarbon, say from 1.5 to 3.5 may in some instances, favor somewhat more efficient conversion, the small gain thus obtained must in each case be considered from the viewpoint of increased costs. Thus the volume for volume ratio represents a value whereby highly efficient results can be obtained without excessive costs for steam generation.

The flow rate employed in the polymerization part of the cycle may vary from three to 15 liquid volumes per volume catalyst per hour but will preferably be from four to eight liquid volumes per volume catalyst per hour. In the depolymerization step the rate will be in the range from two to seven, preferably from three to five liquid volumes per volume catalyst per hour. The stepwise adjustments in temperature will vary in frequency depending upon the nature of the feed stream, starting temperature, etc., but will generally be made about once in each 12 to 30 hours of operation. The magnitude of the changes may be from 10 to 50° F. or more, but will usually not exceed 25° F. for most efficient utilization of the catalyst.

For continuous operation two or more catalyst chambers may be provided, so that as one is spent for the polymerization it may be used for the depolymerization while the other chamber is used for polymerization with fresh catalyst, and this procedure is carried out alternately. In such a case separate means are provided for the separation of polymer from unpolymerized material and for the separation of depolymerized olefin from polymer.

*Example I*

A steel catalyst case was charged with 150 cc. of 8–20 mesh silica-alumina. A $C_4$ blend was used as feed stock, its composition being as follows:

| | Per cent |
|---|---|
| Isobutylene | 14 |
| Isobutane | 26 |
| Butene—1 | 14 |
| Butene—2 | 14 |
| n-Butane | 32 |

This blend was passed over the catalyst at a rate of 5.18 liquid volumes per volume catalyst per hour under a pressure of 1500 pounds per square inch gauge and at temperatures beginning at 197° F. The run was continued for 48 hours, the temperature being elevated in small increments until a maximum of 245° F. had been reached. Analysis of vent gases showed that an average conversion of 76 per cent of the isobutylene was obtained over the entire operating period, and that the amount of polybutenes and codimers formed concurrently was less than 10 per cent.

The polymers were fractionated to provide a cut boiling in the range 212–221° F. comprising substantially pure isooctenes. This fraction was heated to a temperature of 450° F., the vapor admixed with an equal volume of steam, and passed over the catalyst previously used for the polymerization at a flow rate of 2.5 liquid volumes per volume catalyst per hour and with pressure at substantially atmospheric level, temperature in the catalyst zone being held at 450° F. Analysis of the gaseous effluent showed it to be 96.7 per cent pure isobutylene.

*Example II*

A steel catalyst case was charged with 150 cc. of 8–20 mesh silica-alumina. A $C_4$ hydrocarbon blend corresponding in composition to that employed in Example I was passed through the catalyst zone at a rate of 5.2 liquid volumes per volume catalyst per hour. The pressure was maintained at an average value of 1500 pound per square inch gauge with temperatures initially at 225° F. The run was continued for 48 hours, the temperature being increased by small increments until a maximum of 350° F. was reached. Analysis of vent gases showed an average conversion of isobutylene amounting to 75 per cent.

The product was fractionated to provide a cut boiling in the range 212–221° F. comprising substantially pure isooctenes. This fraction was heated to a temperature of 575° F. admixed with steam in a ratio of 3.0 volumes of steam per volume of hydrocarbon (vapor phase conditions) and passed over the catalyst previously used in the polymerization. Temperatures in the catalyst zone were initially 575° F. with a pressure of 50 pounds per square inch gauge. The flow rate was adjusted to an average of 2.7 liquid volumes per volume catalyst per hour. The temperature was increased by small increments as the reaction proceeded until a maximum of 750° F. was attained. Anaylsis of the gaseous effluent showed it to be 95 per cent pure isobutylene.

We claim:

1. A process for the recovery of isobutylene from a gaseous mixed $C_4$ hydrocarbon stream containing isobutylene which comprises, contacting said stream under polymerization conditions with a silica gel catalyst promoted by incorporation of a minor proportion of an oxide of a metal selected from groups III–B and IV–A of the periodic system and forming isobutylene polymer, separating said isobutylene polymer from resulting products of polymerization, contacting said isobutylene polymer under depolymerization conditions in the presence of steam with catalyst which had previously been spent in said polymerization and depolymerizing said isobutylene polymer, and recovering isobutylene from products resulting from said depolymerization.

2. A process for the recovery of isobutylene from a gaseous mixed $C_4$ hydrocarbon stream containing isobutylene which comprises, contacting said stream at a temperature of from 125 to 375° F., a pressure of from 1000 to 2000 pounds per square inch gauge and a flow rate of from 4 to 8 liquid volumes per volume of said catalyst per hour with a silica gel catalyst promoted by incorporation of a minor proportion of an oxide of a metal selected from groups III–B and IV–A of the periodic system and forming isobutylene polymer, separating said isobutylene polymer from resulting products of polymerization, contacting said isobutylene polymer at a temperature of from 400 to 750° F., a pressure of from atmospheric to 100 pounds per square inch gauge, a flow rate of from 3 to 5 liquid volumes per volume of catalyst per hour and in the presence of from 1 to 3.5 volumes of steam per volume of hydrocarbon in vapor phase with catalyst which had been spent in said polymerization and depolymerizing said isobutylene polymer, and recovering isobutylene from products resulting from said depolymerization.

3. The process of claim 2 wherein said silica gel catalyst is promoted by incorporation of a minor proportion of aluminum oxide.

WALTER A. SCHULZE.
JOHN E. MAHAN.

REFERENCES CITED

The following references are of record in the file of this patent:

UNITED STATES PATENTS

| Number | Name | Date |
|---|---|---|
| 2,282,499 | Smeykal et al. | May 12, 1942 |
| 2,349,904 | Hachmuth | May 30, 1944 |
| 2,433,465 | Leum et al. | Dec. 30, 1947 |